3,457,278
Patented July 22, 1969

1

3,457,278
CYCLOPROPYL-4-SULFANILAMIDO-
PYRIMIDINES
Markus Zimmermann, Riehen, Switzerland, assignor to Geigy Chemical Corporation, Ardsley, N.Y., a corporation of New York
No Drawing. Continuation-in-part of application Ser. No. 492,925, Oct. 4, 1965. This application Mar. 14, 1967, Ser. No. 622,900
Claims priority, application Switzerland, Oct. 15, 1964, 13,410/64; Sept. 15, 1965, 12,816/65; Mar. 17, 1966, 3,990/66
Int. Cl. C07d 51/44; A61k 27/00
U.S. Cl. 260—239.75      14 Claims

ABSTRACT OF THE DISCLOSURE 4-sulfanilamido-pyrimidines substituted by a cyclopropyl group in 2-, 5- or 6-position, which are antibacterial against Gram-positive bacteria such as staphylococci, streptococci, pneumococci and against Gram-negative bacteria such as Salmonella, Escherichia and Klebsiella strains; pharmaceutical compositions containing the aforesaid pyrimidines as antibacterial ingredients, and a method of treating diseases caused by such bacteria, by administration of such pyrimidines or pharmaceutical compositions containing them.

CROSS REFERENCE TO EARLIER APPLICATION

This application is a continuation-in-part of my pending patent application Ser. No. 492,925, filed Oct. 4, 1965.

FIELD OF THE INVENTION

The invention concerns new sulphanilamide derivatives, a process for the production thereof, medicaments which contain the new compounds and the use thereof.

SUMMARY OF THE INVENTION

The invention provides, in a first aspect, novel sulfanilamido-pyrimidines of the formula

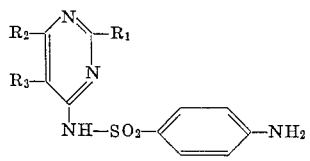

(I)

wherein a single one of
$R_1$, $R_2$ and $R_3$, and preferably one of $R_1$ and $R_2$, represents the cyclopropyl group, and wherein otherwise each of $R_1$ and $R_2$, independently of each other, represents hydrogen, a halogen atom, preferably chlorine, a lower alkyl, lower alkoxy, or lower alkylthio group, and
$R_3$ represents hydrogen or a lower alkyl or lower alkoxy group or a halogen atom, especially chlorine, or, in the case of neither $R_1$ nor $R_2$ being cyclopropyl, the latter group;
as well as their salts with inorganic or organic bases; these novel compounds have an excellent antibacterial action, which being practically harmless to mammals when used in antibacterial effective dosages, are therefore useful as antibacterial agents in the treatment of infectious diseases.

In a second aspect, the invention provides pharmaceutical compositions containing an antibacterially effective amount of a compound according to the invention and a pharmaceutically acceptable carrier therefor.

A third aspect of the invention provides for a method of treating infectious diseases in mammals by administering to an individual suffering therefrom an antibacterially

2 effective amount of a compound according to the invention.

DETAILED DESCRIPTION OF THE INVENTION AND PREFERRED EMBODIMENT

In the compounds of general Formula I, $R_1$, $R_2$ and $R_3$ as alkyl groups are, e.g. the methyl, ethyl, propyl or the isopropyl group and, as alkoxy groups they are, e.g. the methoxy, ethoxy, propoxy or the isopropoxy group. In addition, as alkylthio groups, $R_1$ and $R_2$ are, e.g. the methylthio or the ethylthio group.

As halogen atoms, $R_1$ and/or $R_2$ represent especially chlorine or bromine, but most preferably chlorine.

A preferred class of compounds of the invention comprises the sulfanilamino-pyrimidines falling under the formula

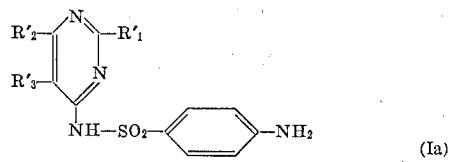

(Ia)

and wherein a single one of the radicals
$R'_1$, $R'_2$ or $R'_3$, and most preferably one of $R'_1$ and $R'_2$, represents the cyclopropyl radical, and wherein otherwise, when not cyclopropyl, each of $R'_1$ and $R'_2$ independently of each other represents hydrogen, lower alkyl, lower alkoxy or lower alkylthio or a halogen atom, especially chlorine or bromine, and
$R'_3$ represents hydrogen or methoxy,
and their pharmaceutically acceptable salts with bases.

These compounds are particularly antibacterially active and particularly well tolerated by mammals.

The new compounds are produced by reacting a compound of the general Formula II

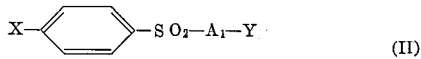

(II)

with a compound of the general Formula III

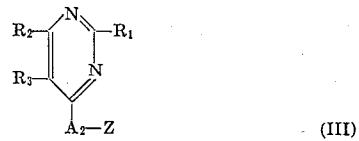

(III)

wherein
X represents the amino group or a group containing nitrogen which can be converted into this group,
one of the two symbols $A_1$ and $A_2$ represents the imino group —NH— and the other the direct bond, and
Y and Z together represent reactive radicals which can be split off, and
$R_1$, $R_2$ and $R_3$ have the meanings given above, the reaction optically being performed in the presence of an acid binding agent, to form a compound of the general Formula IV

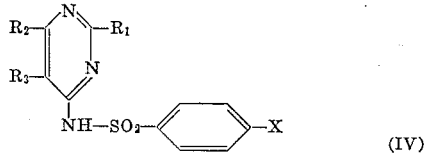

(IV)

wherein $R_1$, $R_2$, $R_3$ and X have the meanings given above, if necessary, converting the group X of the above reaction product into the free amino group and/or, if desired, reacting a reaction product which contains a halogen atom, particularly a chlorine atom, as radical $R_1$ and/or $R_2$ with a metal compound of a low alkanol or alkane thiol or reducing it until this or these halogen atoms are eliminated.

If $A_1$ is the imino group and $A_2$ the direct bond, Y is, for example, a monovalent cation, particularly an alkali metal ion. Z is, e.g., a halogen atom, particularly a chlorine or bromine atom or the grouping of the Formula V

(V)

wherein Ac represents a monovalent anion, particularly a chlorine or bromine ion.

Also, for example, Z can be the cyanamino, nitroamino or, if neither $R_1$ nor $R_2$ represents an alkylthio radical, also a low alkylsulphonyl radical.

If, on the other hand, $A_1$ is the direct bond and $A_2$ is the imino group, then Y is, for example, a halogen atom, particularly a chlorine atom, or an acyloxy radical, e.g., a radical of the general Formula VI

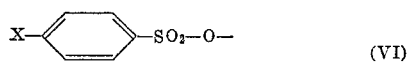
(VI)

and Z is a hyrogen atom, whilst X in this case is preferably not a free amino group. Also free sulphonic acids (Y being OH and $A_1$ a direct bond) can be reacted with 4-acetamido-pyrimidine derivatives ($Z=CH_3—CO$ and $A_2=NH$), e.g. in a lower alkanol, with partial elimination of the latter by distillation.

The reactions of compounds of the general Formula II with those of general Formula III are performed, e.g. in a suitable organic solvent such as dimethyl formamide, acetamide, N,N-dimethyl acetamide or dimethyl sulphoxide, while heating. If an acid is formed as liberated compound Y—Z, then the reaction is performed in the presence of an acid binding agent such as pyridine or trimethylamine in methylene chloride.

Any necessary subsequent conversion of the group X of the reaction product of general Formula IV into the free amino group is, depending on the type of this group, in the broadest sense a hydrolysis or reduction. Radicals X which can be converted into the amino group by hydrolysis are, e.g. acylamino radicals such as the acetamido radicals, low alkoxycarbonylamino radicals, such as the methoxycarbonylamino radical, the benzyloxy- or phenoxycarbonylamino radical, or substituted methylene amino groups such as the benzylidene amino radical or the p-dimethylaminobenzylidene amino radical.

The hydrolysis of corresponding compounds of general Formula IV to set free the amino group can be performed, e.g. in acid medium such as by heating in dilute methanolic hydrochloric acid, or it can also be performed under alkaline conditions, e.g. with diluted sodium hydroxide solution at a temperature range of 20°–100° C. Radicals which can be converted by reduction into the amino group are, e.g. the nitro group or substituted azo radicals such as the phenylazo or p-dimethylamino-phenylazo radical, also e.g. the benzyloxycarbonylamino radical and, again, the benylidene amino radical. Another radical which can be reduced to the amino group is also the nitrilo radical

which is bound by one of its three valences to the benzene rings. In this case, the general Formula II represents the divalent radical of Formula IIa

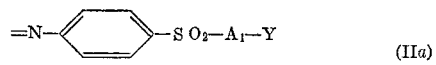
(IIa)

wherein $A_1$ and Y have the meanings given hereinbefore which, while forming a central azo group, is bound by a similar radical to form a derivative of azobenzene-4,4'-disulphonic acid which latter is reacted with two molecules of a pyrimidine derivative of the general Formula III.

Generally, the reduction of these reducible or cleavable groups can be performed catalytically, e.g. with hydrogen in the presence of Raney nickel in an inert solvent, but there are also non-catalytical methods being used.

The reduction of the nitro group to the amino group may be carried out by means of iron in acetic acid or hydrochloric acid. The benzyloxycarbonylamino group is reduced e.g. with sodium in liquid ammonia. The reductive cleavage of the azo group can be performed e.g. with sodium dithionite in ethanol or water, further with zinc in glacial acetic acid or in hydrochloric acid, or with tin (II) chloride in hydrochloric acid.

Reactions of compounds of general Formula IV wherein $R_1$ and/or $R_2$ are halogen atoms, especially chlorine, with metal compounds, in particular alkali metal compounds such as sodium compounds, of low alkanols are most simply performed in the corresponding alkanols as solvents while heating, e.g. at the boiling temperature or at higher temperature in a closed vessel. Also for example, dimethyl sulphoxide or dimethyl formamide can be used as solvents. The same solvents are also suitable for the reactions, with heating, of compounds of general Formula IV wherein $R_1$ or $R_2$ represents chlorine with alkyl mercaptides, particularly with alkali metal alkyl mercaptides. A chlorine atom $R_1$ or $R_2$ is eliminated by reduction, e.g. by catalytic hydrogenation in the presence of a base. For example, palladium on barium sulphate is used as catalyst and aqueous sodium hydroxide solution as reaction medium. The compounds of general Formula IV used for the reactions mentioned above can be direct products of the main reaction or can be obtained therefrom by conversion of the group X into the free amino group. Replacement of a halogen atom $R_1$ and/or $R_2$ by hydrogen can optionally be performed in the same step as the reduction of a group X suitable therefor, e.g. the nitro group.

To produce starting materials of the general Formula III wherein $A_2$ is the direct bond, Z is a chlorine atom, a trimethylammonium ion or a low alkylsulphonyl group, $R_2$ is the cyclopropyl radical, $R_3$ is hydrogen, a low alkyl or alkoxy group and $R_1$ has the meaning given in Formula I, for example β-oxo-cyclopropane propionic acid alkyl esters and their α-alkyl or α-alkoxy derivatives, particularly the ethyl or methyl esters, can be used as starting materials. These are condensed with thiourea, low O-alkyl isoureas or S-alkyl isothioureas or with amidines of low alkanoic acids, such as e.g. formamidine and acetamidine to form 6-cyclopropyl-2-thiouracil(6-cyclopropyl-2-mercapto-4-pyrimidinol) or low 2-alkoxy-6-cycloprop-yl-, 2-alkylthio-6-cyclopropyl-, 6-cyclopropyl- or 2-alkyl-6-cyclopropyl-4-pyrimidinols and their 5-alkyl and 5-alkoxy derivatives. The 6-cyclopropyl-2-thiouracil and its 5-alkyl or 5-alkoxy derivatives can be reduced, e.g. with Raney nickel in the presence of ammonia to 6-cyclopropyl-4-pyrimidinol and its 5-alkyl or 5-alkoxy derivatives, or alkylated to the corresponding 2-alkylthio compounds or, finally, it can be converted, e.g. by boiling with 10% aqueous chloroacetic acid into 6-cyclopropyl uracil and its 5-alkyl or 5-alkoxy derivatives. On treating the 6-cyclopropyl-4-pyrimidinol and its 5-alkyl or 5-alkoxy derivatives mentioned above with phosphorus oxychloride, e.g. in the presence of diethyl aniline, the corresponding 4-chloro-6-cyclopropylpyrimidine and its 5-alkyl or 5-alkoxy derivatives embraced by general Formula III are obtained and, by analogous treatment of 6-cyclopropyl uracil and its 5-alkyl or 5-alkoxy derivatives, 2,4-dichloro-6-cyclopropyl-pyrimidine and its 5-alkyl or 5-alkoxy derivatives are obtained which are also embraced by that formula. On reacting the monochloro compounds previously mentioned with trimethylamine, N-(6-cyclopropyl-4-pyrimidinyl)-N,N,N-trimethyl ammonium chlorides substituted in the 2-position by $R_1$ (whereby $R_1$ does not represent the cyclopropyl radical) and in the 5-position by hydrogen, alkyl or alkoxy groups, are obtained as further starting materials of the general Formula III. The corresponding starting materials having a low alkylsulphonyl radical as radical Z which can be split off are produced e.g. by reaction of 4-chloro-6-cyclopropyl-pyrimidine, 2,4-dichloro-6-cyclopropyl-pyrimidine or 2-alkoxy- or 2-alkyl-4-chloro-6-cyclopropyl-pyrimidines and the 5-alkyl or 5-alkoxy derivatives of the preceding class of compounds with alkali metal salts of low alkane thiols and oxidation of the 4-alkylthio compounds obtained, e.g. by means of peracetic acid.

The $\alpha$-alkyl-$\beta$-oxo - cyclopropane propionic acid alkyl esters mentioned as condensation components for the pyrimidine ring closure reaction are obtainable e.g. from $\beta$-oxo-cyclopropane propionic acid alkyl esters and alkyl iodides in the presence of a low sodium alcoholate, and the corresponding $\alpha$-alkoxy-$\beta$-oxo-cyclopropane propionic acid alkyl esters are obtained from $\alpha$-diazo-$\beta$-oxo-cyclopropane propionic acid alkyl esters and a low alkanol in the presence of copper and boron trifluoride etherate.

Starting materials of the general Formula III wherein $A_2$ represents the direct bond, Z is a chlorine atom, $R_2$ is the cyclopropyl group, $R_3$ is represented by halogen and $R_1$ has the meaning given in Formula I, are produced by reacting 6-cyclopropyl-4-pyrimidinol with N-chlorosuccinimide or N-bromosuccinimide or bromine, respectively, and treating the obtained 5-chloro-6-cyclopropyl - 4-pyrimidinol or 5-bromo-6-cyclopropyl-4-pyrimidinol with a mixture consisting of phosphorous oxychloride and e.g. dimethylformamide, N,N-diethyl-aniline or phosphorus pentachloride in order to obtain 6-cyclopropyl-4,5-dichloro-pyrimidine or 6-cyclopropyl-4-chloro-5-bromo-pyrimidine.

A second group of starting materials of the general Formula III wherein $A_2$ represents the direct bond, Z is a chlorine atom, a trimethyl ammonium ion or a low alkylsulphonyl group, $R_3$ is hydrogen, a low alkyl or alkoxy group, $R_1$ is the cyclopropyl group and $R_2$ has the meaning given in Formula I, are produced by first condensing cyclopropane carboxamidine with low alkanoyl acetic acid alkyl esters and their low $\alpha$-alkyl or $\alpha$-alkoxy derivatives or with malonic acid alkyl esters and their low $\alpha$-alkyl or $\alpha$-alkoxy derivatives to form 2-cyclopropyl-4-pyrimidinol, 2-cyclopropyl-6-alkyl-4-pyrimidinols, 2 - cyclopropyl-6-alkyl-4-pyrimidinols or 2-cyclopropyl-4,6-pyrimidine diols and the 5-alkyl or 5-alkoxy derivatives of the preceding group of compounds.

On reacting these hydroxy compounds with inorganic acid halides such as phosphorus oxychloride or thionyl chloride, compounds embraced by general Formula III are obtained which contain halogen, particularly chlorine as radical Z, namely 2-cyclopropyl-4-halogen pyrimidines, 2-cyclopropyl-6-alkyl-4-halogen pyrimidines, or 2 - cyclopropyl-4,6-dihalogen pyrimidines and the 5-alkyl or 5-alkoxy derivatives of the preceding group of compounds. These latter compounds can be reacted, e.g. with equimolar amounts of alkali metal compounds of low alkanols or alkane thiols to form 2-cyclopropyl-6-alkoxy-4-halogen pyrimidines or 2-cyclopropyl-6-alkylthio-4-halogen pyrimidines and the corresponding 5-alkyl or 5-alkoxy derivatives. Starting materials of the general Formula III containing other reactive radicals Z are obtained from 4-halogen compounds mentioned above, e.g. by reaction with trimethylamine to form 4-trimethylammonium compounds or by reaction with alkali metal salts of low alkane thiols and oxidation, e.g. with peracetic acid, of the 4-alkylthio compounds obtained to form 4-alkylsulphonyl compounds.

Starting materials of the general Formula III wherein $A_2$ is the direct bond and $R_3$ is a cyclopropyl radical are obtained, for example, starting from low cyclopropyl malonic acid alkyl esters or 2-cyclopropyl alkanoylacetic acid alkyl esters, particularly 2-cyclopropyl formylacetic acid alkyl esters and acetoacetic acid alkyl esters. On condensing these with amidines of low alkanoic acids such as formamidine and acetamidine, with low O-alkyl isoureas or S-alkyl isothioureas, 5-cyclopropyl-4,6-pyrimidine diol, 2-alkyl-, 2-alkoxy- or 2-alkylthio-4,6-pyrimidine diols or 5-cyclopropyl-4-pyrimidinols or 6-alkyl-5-cyclopropyl-4-pyrimidinols correspondingly substituted in the 2-position are obtained. By reacting these compounds with inorganic acid halides such as phosphorus oxychloride or thionyl chloride, the hydroxyl groups are replaced by halogen atoms, particularly by chlorine atoms, and, for example, 5-cyclopropyl-4,6-dihalogen pyrimidines or 5-cyclopropyl-4-halogen-pyrimidines or 5-cyclopropyl-6-alkyl-4-halogen-pyrimidines are obtained which can be substituted as defined in the 2-position and are embraced by general Formula III.

Instead of producing pyrimidine derivatives directly in which $R_1$ is hydrogen or a low alkylthio radical by using formamidine or S-alkyl-isothioureas in one of the suitable ring closure reactions mentioned above, also thiourea can be used as reaction component. In this case, 5-cyclopropyl-2-mercapto-4,6-pyrimidine diol, 5 - cyclopropyl - 2 - thiouracil or low 6 - alkyl-5-cyclopropyl-2-thiouracils are obtained as direct reaction products. These are then reduced to compounds in which $R_1$ is hydrogen or alkylated to form compounds having a low alkylthio radical as $R_1$ or, finally hydrolysed by boiling with 10% aqueous chloroacetic acid to form 5-cyclopropyl barbituric acid, 5-cyclopropyl uracil or low 6-alkyl-5-cyclopropyl uracils, which hydroxyl compounds are then converted in the usual way into the corresponding halogen compounds, i.e. into 5-cyclopropyl-2,4,6-trihalogen pyrimidines, 5-cyclopropyl-2,4-dihalogen pyrimidines or low 6-alkyl-5-cycloalkyl-2,4-dihalogen pyrimidines.

Other starting materials of the general Formula III having halogen as radical Z are obtained from the optionally 2-substituted 5-cyclopropyl-4,6-dihalogen pyrimidines mentioned in lines 10–21, column 4 by reaction with equimolar amounts of alkali metal compounds of low alkanols or alkane thiols.

Starting materials of the general Formula III wherein $A_2$ is the imino group and Z is hydrogen and $R_1$, $R_2$ and $R_3$ have the meanings given in Formula I, i.e. 4-amino-6-cyclopropyl-pyrimidine, 4-amino-2-cyclopropyl - pyrimidine, 4-amino-6-cyclopropyl-5 - methoxy-pyrimidine, 4-amino-5-cyclopropyl-pyrimidine, are obtained from those compounds already mentioned of general Formula III which contain a chlorine atom or a low alkylsulphonyl group in the 4-position, by reacting these compounds with ammonia. Also, however, in some of the cyclisation reactions mentioned above, $\alpha$-cyano ketones can be used instead of $\alpha$-acyl acetic acid alkyl esters or cyanoacetic acid alkyl-esters can be used instead of malonic acid dialkyl esters. In this way, substituted 4-aminopyrimidines or 4-amino-6-pyrimidinols which are embraced by general Formula III are obtained. Starting materials of general Formula III are obtained from the latter by converting them into substituted 4-amino-6-halogen pyrimidines and, optionally, further modifying into substituted 4-amino-6-alkoxy-pyrimidines or 4-amino-6-alkylthio-pyrimidines.

The new sulphanilamide derivatives corresponding to the general Formula I are suitable for use in anti-bacterial pharmaceutical preparations which can be administered internally or externally, e.g. in the treatment of infections caused by Gram positive bacteria such as staphylococci, steptococci, pneumococci as well as by Gram negative bacteria such as *Salmonella typhi, Escherichia coli* and *Klebsiella pneumoniae*.

The new active substances are administered orally and parenterally. The daily dosages of the free bases or of pharmaceutically acceptable salts thereof vary between 1 and 100 mg./kg. bodyweight for adult mammals.

For administration they are combined with suitable carriers, e.g. to form tablets, dragées (sugar-coated tablets), suppositories or syrups, or e.g. to form powders or ointments, or they are filled in single doses into capsules.

Suitable dosages units such as tablets or ampoules preferably contain 100–700 mg. of an active substance according to the invention or of a pharmaceutically acceptable salt thereof. Such salts are, for instance, the sodium, potassium, lithium, magnesium or calcium salts, or salts with organic bases such as ethylamine, dimethylamine, diethylaminoethanol, morpholine, ethylenediamine, aminoethanol, diethylamine, diethanolamine or triethanolamine, which salts have a neutral to weakly alkaline reaction and some of which are soluble in water. In this case they can be used, for example, as aqueous solutions for injections.

Dosage units for oral administration preferably contain between 60% and 90% of a compound of general Formula I or of a pharmaceutically acceptable salt of such a compound as active substance. They are produced by combining the active substance with, e.g. solid, pulverulent carriers such as lactose, saccharose, sorbitol, mannitol; starches such as potato starch, maize starch or amylopectin, also laminaria powder or citrus pulp powder; cellulose derivatives or gelatine, optionally with the addition of lubricants such as magnesium or calcium stearate or polyethylene glycols of suitable molecular weights, to form tablets.

Ampoules for parenteral, particularly intramuscular, administration preferably contain a water soluble salt of an active substance in a concentration of, preferably, 5–10%, in aqueous solution, optionally together with suitable stabilising agents and buffer substances.

The following prescription further illustrates the production of tablets:

100,000 kg. of $N^1$-(5-methoxy-6-cyclopropyl-4-pyrimidinyl)sulphanilamide are mixed with 13,000 kg. of dry corn starch and 13,000 kg. of lactose. The mass obtained is mixed with 3,000 kg. glycerol and 5,000 kg. of gelatine in distilled water, whereupon this mass is kneaded during 20 minutes. As soon as it is evenly moistened, it is granulated through a sieve (25 mesh/sq. cm.) and dried. The dried granulates are sieved again (60 mesh/sq. cm.) and then mixed during one hour with 7,500 kg. of potato starch, 7,500 kg. of talcum and 1,000 kg. of magnesium stearate. The mass obtained is pressed into 1,000,000 tablets each weighing 150 mg. and containing 100 mg. of active substance.

The following non-limitation examples illustrate the invention further. The temperatures are given therein in degrees centigrade. All percentages given in this specification are by weight unless expressly stated otherwise. (1 torr=1 mm. Hg).

EXAMPLE 1

(a) 23.2 g. of thiourea and then 34 g. of ethyl-β-oxo-cyclopropane propionate are added to a solution of 10 g. of sodium in 220 ml. of anhydrous ethanol. The mixture is stirred and heated on a bath temperature of 80–85°. After 10 minutes, the mixture thickens whereupon another 50 ml. of anhydrous ethanol are added. The mixture is then stirred for 7 hours at 80–85° oil bath temperature. The reaction mixture is concentrated under 12 torr. On adding water to the residue a cloudy solution is obtained which is extracted three times with ether whereupon it becomes completely clear. The pH of the aqueous solution is then adjusted to 2–3 with 5 N hydrochloric acid, the precipitate is separated by suction filtration and dried over phosphorus pentoxide in a vacuum desiccator. The 6 - cyclopropyl-2-thiouracil (6-cyclopropyl-2-mercapto-4-pyrimidinol) obtained melts at 234–237° with gas development. It is sufficiently pure for the following reactions. Analytically pure material is obtained by recrystallisation from aqueous ethanol, it melts at 236–238° with gas development.

(b) 14.5 g. of crude 6-cyclopropyl-2-thiouracil are stirred in a mixture of 230 ml. of water and 23 ml. of concentrated ammonia and the whole is heated to 80°. 52 g. of moist Raney nickel are then added in portions whereupon the mixture foams. On completion of the addition of the metal, the mixture is stirred for 1½ hours at an oil bath having a temperature of 120–130°. The Raney nickel is then allowed to settle, the solution is decanted as far as possible and the remainder of the solution is separated from the catalyst by suction. The nickel is washed with 2 portions of 100 ml. of boiling water. The filtrates are combined and concentrated. There remains the crude 6-cyclopropyl-4-pyrimidinol which weighs 7.7 g. and melts at 163–165°. On concentrating, a part of the substance is removed with the steam. Thus the pH of the distillate is adjusted to 6–7 and it is continuously extracted with ether for 24 hours. 1.4 g. of additional 6-cyclopropyl-4-pyrimidinol are obtained.

(c) 36 ml. of phosphorus oxychloride are mixed with 7.2 ml. of N,N-diethyl aniline and 7.2 g. of crude 6-cyclopropyl-4-pyrimidinol are sprinkled in. The mixture is heated for 30 minutes in an oil bath having a temperature of 90° and the brown solution obtained is concentrated in vacuo. The oily residue is poured onto ice and the emulsion is extracted three times with ether. The ether solution is washed, first with ice cold 5% sodium bicarbonate solution and then with saturated sodium chloride solution. The ether solution is then dried over sodium sulphate, the ether is distilled off and 6.7 g. of crude 4-chloro-6-cyclopropyl-pyrimidine remain. This product is distilled over a Vigreux column; it passes over at 97–98° under torr, 4.3 g. of a colourless oil are obtained which crystallises after a short time.

(d) A mixture of 4.3 g. of 4-chloro-6-cyclopropyl-pyrimidine, 12.7 g. of the sodium salt of sulphanilamide, 61 ml. of dimethyl formamide and a solution of 0.33 g. trimethylamine in 3 ml. of dimethyl formamide are combined and the whole mixture is stirred for 5 hours at a bath temperature of 60°. A further portion of 0.33 g. of trimethylamine in 3 ml. of dimethyl formamide are then added and the mixture is stirred for another 9 hours at a bath temperature of 70°. The thinly liquid pale brown suspension is evaporated to dryness under 0.1 torr pressure. The residue is dissolved in water, the pH of the solution is adjusted to 9.0 with carbon dioxide and it is stirred for 2 hours. Unconsumed sulphanilamide is then separated and the pH of the filtrate is adjusted to 6.0 with 5 N hydrochloric acid. After 1 hour, the precipitated crude product is separated by suction filtration and recrystallised from ethanol. $N^1$-(6-cyclopropyl-4 - pyrimidinyl) - sulphanilamide is obtained, M.P. 205–207°.

EXAMPLE 2

(a) 9.5 g. of acetamidine hydrochloride are added to a mixture of 15.6 g. of ethyl-β-oxo-cyclopropane propionate and 5 ml. of anhydrous ethanol and the whole is well stirred. 4 g. of sodium hydroxide pellets and 5 ml. of anhydrous ethanol are then added and the whole is stirred from time to time until the entire sodium hydroxide is dissolved. The mixture is pored into a crystallising dish and kept for about one week over concentrated sulphuric acid in a vacuum desiccator under 12 torr. The sulphuric acid is renewed daily. As soon as the reaction mixture is completely dry it is finely pulverised and mixed with 4 g. of sodium carbonate and 4 g. of sodium bicarbonate. This mixture is continuously extracted with benzene for about 18 hours, the benzene extract is concentrated to 200 ml. and 100 ml. of hexane are added to the concentrate. Pure 6-cyclopropyl-2-methyl-4-pyrimidinol crystallises therefrom; M.P. 204–206°.

(b) 1.5 g. of this pyrimidol, 7.5 ml. of phosphrous oxychloride and 1.5 ml. of N,N-diethyl aniline are stirred for 45 minutes at a bath temperature of 90°. The brown solution formed is evaporated to dryness under 12 torr. Ice is added to the residue which is then extracted three times with ether. The ether extracts are washed first with ice cold sodium bicarbonate solution and then with water and finally dried over sodium sulphate. After distilling off the ether, 4-chloro-6-cyclopropyl-2-methyl-pyrimidine remains as a brown oil which is used direct for further reaction.

(c) 1.5 g. of the above mentioned pyrimidine and 4.1 g. of the sodium salt of sulphanilamide are mixed with 20 ml. of dimethyl formamide, 0.1 g. of trimethylamine are added and the whole is stirred for 18 hours on an oil bath having temperature of 60°. The suspension then obtained is evaporated to dryness under high vacuum. The residue is dissolved with water and the pH of the reacting solution is adjusted to 8–9 with solid carbonic acid. After about 1 hour, the ice cooled mixture is filtered and the excess sulphanilamide is removed. The pH of the filtrate is adjusted to 5–6 with 5 N hydrochloric acid whereupon the crude reaction product precipitates, first in a smeary form and then in crystalline form. It is purified by recrystallisation from isopropanol/water (1:1) and then dried for 20 hours at 80° under 0.1 torr. The $N^1$-(6-cyclopropyl-2-methyl-4-pyrimidinyl) - sulphanilamide obtained melts at 166–167° with slight gas development.

EXAMPLE 3

(a) A reaction mixture containing 6-cyclopropyl-2-thiouracil is obtained analogously to Example 1 (a) from 2.53 g. of sodium in 60 ml.of anhydrous ethanol, 8.75 g. of thiourea and 15.6 g. of ethyl-β-oxo-cyclopropane propionate. Without isolating the aforesaid mercapto compound, 20 ml. of water are added directly to the still hot mixture and then 9.3 ml. of dimethyl sulphate are added dropwise. The reaction is exothermic, so that the addition of dimethylsulphate causes the reaction mixture to boil gently. On completion of the addition of dimethylsulphate, the whole is boiled for another 15 minutes, the opaque solution is then filtered and the filtrate is evaporated to dryness in vacuo. The residue is dissolved in 90 ml. of water, the pH is adjusted to 9 by adding a small amount of aqueous 2 N sodium hydroxide solution and the solution is extracted twice with ether. The pH of the aqueous phase is then adjusted to 1–2 with 5 N hydrochloric acid, the acidified phase is stirred for 1 hour with ice cooling and the precipitated 6-cyclopropyl-2-methylthio-4-pyrimidinol is then separated by suction filtration; it melts at 196–198°.

6-cyclopropyl-2-methylthio-4-pyrimidinol is also obtained by reacting 16.7 g. of S-methyl-isothiourea sulphate in 40 ml. of anhydrous methanol with a solution of 5.06 g. of sodium in 40 ml. of anhydrous methanol, adding 15.6 g. of ethyl-β-oxo-cyclopropane propionate while cooling with ice and stirring the whole for 20 hours with ice cooling and then for 4 days at 20–5°. The reaction mixture is evaporated to dryness under vacuum and the residue is dissolved in 100 ml. of water. The pH of the solution is adjusted to 1 by the addition of 5 N hydrochloric acid, the precipitated 6-cyclopropyl-2-methylthio-4-pyrimidinol is separated by suction filtration, washed with a small amount of water and dried. It melts at 196–199°.

(b) and (c) The crude 4-chloro-6-cyclopropyl-2-methylthio-pyrimidine is obtained analogously to the process of Example 2(b) from 6-cyclopropyl-2-methylthio-4-pyrimidinol using phosphorus oxychloride and diethylaniline, the crude product is then reacted analogously to Example 2(c) with the sodium salt of sulphanilamide and $N^1$-(6-cyclopropyl - 2-methylthio - 4-pyrimidinyl)-sulphanilamide is obtained; M.P. 163–165°.

EXAMPLE 4

(a) A solution of 9.2 g. of sodium in 100 ml. of anhydrous methanol is added dropwise to a solution of 23 g. of O-methylisourea-hydrochloride in 80 ml. of anhydrous methanol with simultaneous cooling to prevent the temperature from rising above a −5°. 31.2 g. of ethyl-β-oxo-cyclopropane propionate are then added dropwise and the reaction mixture is stirred for 2 to 3 days at 20–25°. It is then evaporated to dryness under vacuum, the residue is mixed with 100 ml. of water and acidified with 2 N hydrochloric acid to pH 4. The 6-cyclopropyl-2-methoxy-4-pyrimidinol which precipitates can be used directly for the further reactions. It can also be recrystallised from 50% ethanol and then melts at 161–163° with previous sintering at 153°.

(b) 9.1 g. of crude 6-cyclopropyl-2-methoxy-4-pyrimidinol are added to a mixture of 100 ml. of thionyl chloride and 5 ml. of dimethyl formamide. The yellow solution is stirred for 15 minutes with ice cooling under a pressure of 100–120 torr, the ice bath is then removed and the mixture is stirred for 5 hours at 20–25°. Volatile portions of the mixture are then distilled off at 20–25° and 12 torr, the greasy residue is dissolved in a mixture of 2 N sodium carbonate solution and ether and the ethereal phase is separated. The aqueous phase is washed twice with ether, the ethereal extracts are combined, washed once with water and dried over sodium sulphate. After filtration and removal of the ether by distillation, the crude 4-chloro-6-cyclopropyl-2-methoxy-pyrimidine remains which is sufficiently pure for the following reaction.

(c) The 4-chloro-6-cyclopropyl-2-methoxy-pyrimidine obtained according to (b) above is reacted analogously to Example 2(c) with the sodium salt of sulphanilamide whereby $N^1$-(6-cyclopropyl)-2-methoxy-4-pyrimidinyl)-sulphanilamide is obtained. The latter melts at 147–149° with gas development.

EXAMPLE 5

(a) A solution of 0.46 g. of sodium in 10 ml. of anhydrous ethanol is saturated with methyl mercaptan at 5°. This solution is then added dropwise while stirring to a 35° warm solution of 3.9 g. of 6-cyclopropyl-4-chloropyrimidine in 10 ml. of anhydrous ethanol. The whole is then refluxed for 2 hours and evaporated to dryness in vacuo. The residue is washed four times with hot hexane and then distilled. The 6-cyclopropyl-4-methylthio-pyrimidine pases over at a boiling temperature of 125–128°/13 torr.

(b) 3 g. of the above methylthio compound are added dropwise to 38.4 ml. of a 10% peracetic acid solution in glacial acetic acid and the temperature is kept between 7 and 10°. After a slightly exothermic reaction, the whole is stirred for 10 minutes at 22–25° and then for 3 minutes at 80° reaction temperature. The colourless, clear solution is distilled in vacuo and the fraction which boils over 100° (0.006 mm.) contains the 6-cyclopropyl-4-methylsulphonyl-pyrimidine and is redistilled.

(c) A mixture of 4.9 g. of sulphanilamide solution in 30 ml. of dimethyl formamide and 2 g. of the redistilled sulphone is stirred for 9 hours at 80°. The thin suspension is distilled in vacuo, water is added to the residue and the pH is adjusted to 9. Excess sulphanilamide is separated by suction filtration and then the pH of the mother liquor is adjusted to 6. A precipitate is formed which is recrystallised from a mixture of ethanol and a small amount of water. The $N^1$-(6-cyclopropyl-4-pyrimidinyl)-sulphanilamide obtained melts at 205–207°. It is identical with the product obtained according to Example 1.

EXAMPLE 6

(a) 3.9 g. of 4-chloro-6-cyclopropyl-pyrimidine are dissolved in 60 ml. of a solution obtained by saturating ethanol with anhydrous ammonia gas while cooling with ice. The solution is heated for 5 hours at 90–95° in an autoclave and afterwards the reaction mixture is evaporated to dryness in vacuo. The residue is shaken with 10 ml. of 2 N hydrochloric acid and 30 ml. of ether, the phases are separated and the ether phase is again extracted with 10 ml. of 2 N hydrochloric acid. The aqueous acid extracts are combined and strongly alkalised with 10 N sodium hydroxide solution. The crude amine precepitates; it is dissolved in ether and the ethereal solution is dried with sodium sulphate. Pure 4-amino-6-cyclopropyl-pyrimidine is obtained by crystallisation from ether/hexane. It melts at 151–153°.

(b) 0.6 g. of the amine obtained according to (a) are dissolved in 6 ml. of anhydrous pyridine and 1.3 g. of N-acetyl-sulphanilyl chloride are added in portions. The whole is first stirred for 18 hours at 20° and then for 20 hours at 60° whereupon the brown solution is evaporated to dryness in vacuo. The residue obtained is stirred with water and the mixture is strongly acidified by the addition of concentrated hydrochloric acid. The precipitate is separated by filtration, dried over phosphorus pentoxide and recrystallised from a mixture of ethanol and a small amount of water. The $N^4$-acetyl-$N^1$-(6-cyclopropyl-4-pyrimidinyl) - sulphanilamide melts at 227–228°.

(c) 0.5 g. of the above mentioned acetyl compound are mixed with 4 ml. of 2 N sodium hydroxide solution and the mixture is hydrolised by heating for 2 hours at 90°. The pH is then adjusted to 5–6 with 2 N hydrochloric acid and the precipitated crude sulphanilamide derivative is separated by suction filtration. On crystallising from aqueous ethanol, the pure $N^1$-(6-cyclopropyl-4-pyrimidinyl)-sulphanilamide is isolated. It melts at 205–207° and is identical with the product obtained according to Example 1.

EXAMPLE 7

(a) 20.83 g. of cyclopropyl carboxamidine hydrochloride are dissolved in 60 ml. of dry methanol at 20° C. and the solution is cooled to −5 to −8°. At this temperature, first a solution of 8.04 g. of sodium in 81 ml. of dry methanol is added dropwise and then 23.1 g. of dimethyl malonate are added at once. The reaction mixture is stirred for 18 hours at 20° and then left to stand for 3½ days. The suspension is evaporated to dryness in vacuo, the residue obtained is dissolved in 100 ml. of warm water and treated with 1–2 g. of active charcoal. The pH of the filtered solution is then adjusted to 4–5 with 6 N hydrochloric acid, the precipitate formed after stirring for 1 hour in an ice bath is separated by suction filtration and dried at 80° in vacuo. The crude 2-cyclopropyl-4,6-pyrimidin-diol melts at 307–310°. It can be recrystallised from 60% aqueous alcohol and then melts at 313–313.5°.

(b) First 17.4 ml. of dry pyridine and then 15.8 g. of the diol obtained above are added to 158 ml. of ice cold phosphorus oxychloride. The whole is stirred at an oil bath temperature of 100° for two hours and then the excess phosphorus oxychloride is distilled off in vacuo. The brown residue is decomposed with ice and extracted three times with ether. The ether extracts are washed once with water and dried with sodium sulphate. The 2-cyclopropyl-4,6-dichloropyrimidine distills between 105–107°/12 torr; refractive index: $n_D^{20°}$: 1.560.

(c) 37.7 g. of sulphanilamide solution and 18.4 g. of 2-cyclopropyl-4,6-dichloropyrimidine are stirred for 1 hour in 70 ml. of dimethyl formamide at 90–95°. After distilling off the solvent under high vacuum, the residue is stirred into 600 ml. of water and the excess sulphanilamide is filtered off from the suspension which has a pH of 9. The pH of the filtrate is adjusted to 5–6 with 5 N hydrochloric acid whereupon the crude product precipitates. It is separated by suction filtration, dried and extracted in a Soxhlet apparatus with benzene for 15 hours. The extracted $N^1$-(2-cyclopropyl-6-chloro-4-pyrimidinyl)-sulphanilamide crystallises from ethyl acetate/hexane and melts between 162–163°. In a thin layer chromatogram (Silicagel Merck G) using chloroform/methanol (4:1) as solvent, it has an $Rf$ value of 0.58.

EXAMPLE 8

(a) 15.5 g. of the 2-cyclopropyl-4,6-dichloropyrimidine obtained according to Example 7(b) are added while stirring to the suspension of 38.7 g. of $N^4$-acetyl sulphanilamide sodium in 168 ml. of dry methyl formamide at 80°, the addition being completed within 30 minutes. The temperature is then raised to 105° and the solvent is distilled off in vacuo after 4 hours. The residue is stirred into 110 ml. of water and the suspension, the pH of which is 8–9, is cooled for 1 hour in an ice bath and then filtered. The pH of the filtrate is adjusted to 5 with glacial acetic acid and the crude product is filtered off under suction. After crystallising once from ethanol and a small amount of dimethyl formamide, the pure $N^4$-acetyl-$N^1$-(2-cyclopropyl - 6 - chloro-4-pyrimidinyl)-sulphanilamide melts at 233–235°.

(b) 1.8 g. of the above compound are stirred with 40 ml. of 0.5 N sodium hydroxide solution for 3 hours at a bath temperature of 95–100°. The pH is then adjusted to 5–6 with 5 N hydrochloric acid and, after cooling for 1 hour, the mixture is filtered. After crystallising once from ethyl acetate/hexane, pure $N^1$ - (2 - cyclopropyl-6 - chloro - 4 - pyrimidinyl) - sulphanilamide is obtained. It is identical with the product obtained in Example 7.

EXAMPLE 9

(a) 12.6 g. of the product obtained according to Example 8a are dissolved in 200 ml. of water and 69 ml. of 1 N sodium hydroxide solution and the solution is catalytically reduced in the presence of 4 g. of palladium/barium sulphate (5%). 763 ml. of hydrogen are taken up within 3 hours at 25° and normal pressure. The catalyst is filtered off and the pH of the filtrate is adjusted to 4 with 5 N hydrochloric acid. The suspension is left to stand for some hours in a refrigerator and then the crude $N^4$ - acetyl - $N^1$ - (2 - cyclopropyl-4-pyrimidinyl) - sulphanilamide is filtered off under suction. It melts at 270° and is sufficiently pure for the subsequent hydrolysis.

(b) 11.2 g. of the crude acetyl compound (Example 9a) are stirred in 224 ml. of 2 N sodium hydroxide solution at a bath temperature of 90–100° for 2½ hours. The clear solution is treated with active charcoal and the pH of the filtrate is adjusted to 5 with 5 N hydrochloric acid. The suspension is left to stand for some hours in a refrigerator and then filtered. After crystallising the crude product once from isopropanol/water, pure $N^1$ - (2-cyclopropyl - 4 - pyrimidinyl) - sulphanilamide is obtained, M.P. 193–194°. Thin layer chromatography gives an $Rf$ value of 0.50 (Silicagel Merck G; chloroform/methanol=4:1).

EXAMPLE 10

3.25 g. of the $N^1$ - (2 - cyclopropyl - 6 - chloro-4-pyrimidinyl) - sulphanilamide obtained according to Example 7c, are dissolved in 500 ml. of water and 20 ml. of 1 N sodium hydroxide solution. The resulting solution is dehalogenated with hydrogen at 20° and normal pressure in the presence of 2 g. of 5% palladium/barium sulphate catalyst. The reaction mixture is filtered and acidified to pH 5 with 5 N hydrochloric acid. After cooling for 2 hours in an ice bath, the precipitate is filtered off and recrystallised from aqueous isopropanol. The pure $N^1$ - (2 - cyclopropyl - 4 - pyrimidinyl) - sulphanilamide melts at 193–194°.

EXAMPLE 11

9.17 g. of $N^4$ - acetyl - $N^1$ - (2 - cyclopropyl - 6-chloro - 4 - pyrimidinyl) - sulphanilamide are added to a solution of 2.87 g. of sodium in 51.5 ml. of dry methanol and the whole is heated and stirred in an autoclave for 5 hours at 120°. The reaction mixture is evaporated to dryness and the residue is stirred in 25 ml. of 1 N sodium hydroxide solution for 1 hour in an oil bath having a temperature of 90–100°, whereupon the hydrolysis is completed. The solution is diluted with 100 ml. of water and treated with active charcoal. The pH of the filtrate is adjusted to pH 5–6 by the addition of 5 N hydrochloric acid and, after standing for 2 hours in a refrigerator, the solution is filtered. After crystallisation from ethanol/water, the pure product, $N^1$ - (2-cyclopropyl - 6 - methoxy - 4 - pyrimidinyl) - sulphanilamide, is obtained, M.P. 168–170°.

13

The same product is obtained by reacting N¹ - (2-cyclopropyl - 6 - chloro - 4 - pyrimidinyl) - sulphanilamide with sodium methylate in methanol (as described above, without hydrolysis).

EXAMPLE 12

(a) 1.65 g. of 2 - cyclopropyl - 4,6 - dichloropyrimidine (cf. Example 7b) are mixed with 5 ml. of dry methanol and the mixture is added dropwise to a stirred solution of 0.2 g. of sodium in 16.5 ml. of dry methanol between 0 and 4°. After stirring for some hours, the solvent is distilled off and the residue is extracted three times with ether. The crude, oily 2 - cyclopropyl - 4-chloro - 6 - methoxy - pyrimidine is obtained from the ether extract.

(b) This crude product is reacted with 4.2 g. of sulphanilamide sodium in 15 ml. of dimethyl formamide with the addition of 0.59 g. of trimethylamine. After stirring for 20 hours at 70°, the dimethyl formamide is distilled off under high vacuum and the residue is dissolved in water. The pH is adjusted to 8–9 by the addition of solid carbon dioxide and the excess sulphanilamide is filtered off. The filtrate is washed once with ether and acidified to pH 5–6 with 5 N hydrochloric acid. The precipitate formed is recrystallised from isopropanol/water.

The N¹ - (2 - cyclopropyl - 6 - methoxy - 4 - pyrimidynyl) - sulphanilamide obtained is identical with the product obtained according to Example 11.

EXAMPLE 13

(a) 2 g. of freshly pulverised sodium hydroxide are sprinkled into a mixture of 6.5 g. of acetoacetic acid ethyl ester and 6 g. of cyclopropyl carboxamidine hydrochloride in 5 ml. of dry ethanol. The whole is stirred for 15 minutes at 20° and then the reaction mixture is left to stand for 7 days in an open dish over phosphorus pentoxide in a vacuum desiccator. It is evacuated at least once a day to 12 torr and the drying agent is replenished as necessary. A hard mass of crystals is formed from the reaction mixture which at the beginning was liquid. On completion of the reaction, the crystal mass is pulverised in a mortar with 2 g. of sodium carbonate and 2 g. of sodium bicarbonate and then it is extracted with benzene for 20 hours in a Soxhlet apparatus. The crude extract is recrystallised from isoprapanol/water. The pure 2-cyclopropyl - 6-methyl-4-pyrimidinol melts at 191–193°.

(b) 7.4 g. of the above pyrimidinol are added to an ice cold mixture of 50 ml. of phosphorus oxychloride and 7.4 g. of N,N - diethyl aniline and the whole is stirred for 45 minutes in an oil bath having a temperature of 90°. The excess phosphorus oxychloride is then distilled off in vacuo and ice and water are added to the residue which is then extracted three times with ether. The ethereal phase is washed once with water, and dried over sodium sulphate. On distilling, a yellowish oil, 2-cyclopropyl - 4 - chloro - 6 - methyl - pyrimidine, is obtained, B.P. 104–107°/12 torr.

(c) 8.7 g. of the above chloro-compound are added to a suspension of 25.2 g. of sulphanilamide sodium in 55 ml. of dry dimethyl formamide and 0.354 g. of trimethylamine. The whole is stirred for 40 hours in an oil bath having a temperature of 80° and then the solvent is distilled off under high vacuum. The residue is dissolved in water and the pH of the solution is adjusted to 9 with carbon dioxide. The suspension thus obtained is left to stand for 1 hour at 0° and then the excess sulphanilamide is filtered off. The filtrate is washed with ether and the pH is adjusted to 5–6 with 5 N hydrochloric acid. The greasy precipitate obtained is dissolved in 2 N sodium hydroxide solution and again precipitated with 5 N hydrochloric acid whereupon a crystalline precipitate is formed. Recrystallisation from isopropanol/water yields pure N¹ - (2 - cyclopropyl - 6 - methyl - 4-pyrimidinyl) - sulphanilamide, M.P. 180–182°.

14

EXAMPLE 14

(a) 3.4 g. of 6-cyclopropyl-2-mercapto-4-pyrimidinol (produced according to Example 1, isolated by precipitation with 5 N hydrochloric acid) are refluxed for 10 hours in a solution of 6.5 g. of chloracetic acid and 60 ml. of water. The reaction mixture is then cooled in an ice bath and the crude 6-cyclopropyl uracil which precipitates is filtered off under suction. It melts at 211–217° and is sufficiently pure for the following reaction.

(b) 3.1 ml. of N,N-diethyl aniline are added to 15.5 ml. of phosphorus oxychloride and 3.1 g. of crude 6-cyclopropyl uracil are sprinkled therein. The mixture is stirred for 30 minutes at a bath temperature of 90°. The dark brown solution is then concentrated under 12 torr while gently heating. The residue is poured onto ice and the mixture is extracted with ether three times. The ether extract is washed once with water, dried with sodium sulphate and then evaporated. The crude 6-cyclopropyl-2,4-dichloro-pyrimidine remains as an oil.

(c) 1.9 g. of 6-cyclopropyl-2,4-dichloropyrimidine are added to a solution of 0.24 g. of sodium in 10 ml. of dry propanol and the mixture is stirred for 18 hours at 20° and for 6 hours at 40°. Excess propanol is then distilled off in vacuo, the residue is triturated with a small amount of water and is then extracted three times with ether. The ether extract is washed with a small amount of water and dried over sodium sulphate. 4-chloro-6-cyclopropyl-2-propoxy-pyrimidine is obtained, B.P. 82–83°/0.3 torr.

1.6 g. of the above chloro-compound are reacted with 3.2 g. of sulphanilamide sodium in 10 ml. of dry dimethyl formamide with the addition of about 0.06 g. of trimethylamine and the resulting reaction mixture is worked up as described in Example 2(c). The pure N¹-(6 -cyclopropyl-2-propoxy-4-pyrimidinyl)-sulphanilamide obtained melts at 129–131°.

In an analogous manner, N¹-(6-cyclopropyl-2-bromo-4-pyrimidinyl)-sulphanilamide is obtained by repeating Example 14, but using in step (b) in lieu of phosphorus oxychloride an equivalent amount of phosphorus oxybromide and treating the resulting 6-cyclopropyl-2,4-dibromo-pyrimidine with sulphanilamide sodium as described in step (c) of Example 7.

The reaction product is charomatographed on silica gel and eluted with chloroform methanol (volume ratio 4:1), and the above-mentioned sulphanilamide is obtained.

By reacting 6-cyclopropyl-2,4-dichloro-pyrimidine, obtained in step (b) of Example 14, with sulphanilamide sodium as described in step (c) of Example 7 and chromatographing in the same manner as described above, N₁ - (6-cyclopropyl-2-chloro-4-pyrimidinyl) - sulphanilamide is obtained.

EXAMPLE 15

2.7 g. of 4-amino-6-cyclopropyl-pyrimidine obtained according to Example 6(a) and 9.45 g. of N⁴-acetyl-sulphanilyl chloride are added to 18 ml. of methylene chloride and, at a bath temperature of 40°, a solution of 2.4 g. of trimethylamine in 24 ml. of benzene is added dropwise. After 6 hours, another 0.2 g. of trimethylamine in 2 ml. of benzene are added whereupon the whole is stirred for a further 6 hours and the bath temperature is maintained at 40°. The solvent is then distilled under vacuum and, to hydrolyse, the residue is heated for 2 hours at a temperature of 90–100° in 40 ml. of 2 N sodium hydroxide solution. 0.2 g. of active charcoal are then added, the mixture is filtered and the filtrate is acidified with 5 N hydrochloric acid to pH 5–6 whereupon the crude N₁-(6-cyclopropyl-4-pyrimidinyl)-sulphanilamide precipitates. It is identical with the product obtained according to Example 1.

EXAMPLE 16

(a) 7 g. of 4-amino-6-cyclopropyl-pyrimidine are dissolved in 80 ml. of dry pyridine and 10.5 g. of azobenzene-4,4'-disulphochloride are added to the solution in portions while stirring. The whole is heated to 60° for 8 hours and then the pyridine is distilled off in vacuo. The residue is dissolved in 2 N sodium hydroxide solution, filtered and again precipitated at pH 3 with 2 N hydrochloric acid. The crude 4,4'-bis-(6''-cyclopropyl-4''-pyrimidinyl-aminosulphonyl)-azobenzene is filtered off and is used direct for the subsequent hydrogenolytic cleavage.

(b) 12 g. of the azo compound are dissolved in 120 ml. of 0.5 N sodium hydroxide solution and, with the addition of 3 g. of Raney nickel catalyst, hydrogenated at 20° and normal pressure. On completion of the hydrogen take-up, the catalyst is filtered off and the pH of the solution is adjusted to 6 with 5 N hydrochloric acid. It is cooled for 1 hour in an ice bath and then the $N^1$-(6-cyclopropyl-4-pyrimidinyl)-sulphanilamide is filtered off under suction. It is identical with the product described in Example 1 and, after one crystallisation from ethanol, it melts at 205–207°.

EXAMPLE 17

(a) 3.45 g. of sodium are dissolved in 50 ml. of dry methanol and the solution is cooled. 6.5 g. of formamidine acetate are added in portions while stirring, during which addition the temperature should not rise above 5°. After about 10 minutes, 10 g. of diethyl-cyclopropyl-malonate are added dropwise and the temperature is still kept under 5°. The whole is then stirred for 48 hours at 20° and then heated at 60° for 7 hours. The reaction mixture is evaporated in vacuo and the residue is mixed with ether. It is filtered off under suction and the filter residue is dissolved in 90 ml. of warm water, the solution is treated with 0.5 g. of active charcoal, filtered and then the pH of the filtrate is adjusted to 4–5 with 5 N hydrochloric acid. The precipitated 5-cyclopropyl-4,6-pyrimidindiol melts at 246° (with decomposition).

(b) 6.4 g. of 5-cyclopropyl-4,6-pyrimidindiol are added to 45 ml. of ice cooled phosphorus oxychloride and then 3.2 ml. of dimethyl aniline are added. The whole is stirred for 1½ hours in an oil bath having a temperature of 90–100° whereupon a brown-red solution is obtained. Excess phosphorus oxychloride is distilled off in vacuo and ice is added to the solid residue. The reaction product is obtained from the aforesaid mixture by extracting three times with ether. The ethereal solution is washed first with water, then with dilute, ice cold sodium bicarbonate solution and finally again with water and dried over sodium sulphate. After distilling off the ether, the crude 5-cyclopropyl-4,6-dichloropyrimidine remains as an oil.

(c) 8.9 g. of crude 5-cyclopropyl-4,6-dichloropyrimidine are added dropwise to a 90° hot mixture of 18.3 g. of sulphanilamide sodium in 74 ml. of dry dimethyl formamide. The reaction is exothermic; the temperature rises spontaneously to 98°. The whole is then stirred for 1¼ hours at a bath temperature of 100°. The brown solution is evaporated under high vacuum and the residue is dissolved in 100 ml. of water. Solid carbon dioxide is added to the solution until the pH is adjusted to 8 and, after standing for 1 hour in an ice bath, the excess sulphanilamide is filtered off under suction. The filtrate is stirred wtih active charcoal, filtered and 5 N hydrochloric acid is added until the pH is 5–6. The reaction product is left to stand in an ice bath for another hour and then the crude product is filtered off. One crystallisation from alcohol/water yields pure $N^1$-(6-chloro-5-cyclopropyl-4-pyrimidinyl)-sulphanilamide, M.P. 179–180°.

EXAMPLE 18

5 g. of the $N^1$-(6-chloro-5-cyclopropyl-4-pyrimidinyl)-sulphanilamide obtained according ot Example 17 are added to a solution of 1.75 g. of sodium in 40 ml. of anhydrous methanol and the whole is heated in an autoclave for 4 hours at 125°. The brown solution is evaporated in vacuo and the residue is dissolved in 40 ml. of water. The pH is then adjusted to 5–6 with 5 N hydrochloric acid, the reaction product so obtained is cooled for 1 hour in an ice bath and then the crude product is filtered off. Pure $N^1$-(6-methoxy-5-cyclopropyl-4-pyrimidinyl)-sulphanilamide is obtained by one crystallisation from alcohol/water, M.P. 182–184°.

EXAMPLE 19

(a) 17.6 g. of α-diazo-β-oxo-cyclopropane propionic acid ethyl ester (cf. L. J. Smith and S. McKenzie, J. Org. Chem. 15, 74 (1950)) are dissolved in 135 ml. of dry methanol. This solution, with the addition of 1 g. of copper powder and 4 drops of borontrifluoride etherate, is heated at a bath temperature of 60–70°. At first there is strong nitrogen development which has been completed after 2 hours. The reaction mixture is then filtered and the filtrate is concentrated to dryness. The oil which remains is fractionated, whereupon the pure α-methoxy-β-oxo-cyclopropane propionic acid ethyl ester is obtained, B.P. 60–61°/0.1 torr.

(b) 2.25 g. of sodium are added to 45 ml. of dry ethanol and then 8.75 g. of thiourea and 12.25 g. of the ester obtained according to Example 19(a) are added. The mixture is then refluxed for 7 hours. The ethanol is distilled off under vacuum, the residue is dissolved in 25 ml. of warm water and the solution is decoloured with 1 g. of active charcoal. The charcoal is filtered off and the pH of the filtrate is adjusted to 6 with 5 N hydrochloric acid. The suspension obtained is left to stand for 1 hour at 0° after which the crude 2-mercapto-5-methoxy-6-cyclopropyl-4-pyrimidinol is filtered off under suction. It is washed with water and dried in vacuo, whereupon it melts at 208–210° with decomposition. Recrystallisation of the crude product from ethanol yields the pure compound which melts at 211–213° with decomposition.

(c) 8 g. of the crude mercapto compound produced according to Example 19(b) are added to 100 ml. of distilled water and 10 ml. of 25% (percent by weight) of aqueous ammonia. The mixture obtained is heated to 70–80° while stirring, 24 g. of Raney nickel in the form of a moist paste are added in portions and then the suspension is heated for 1½ hours in a bath of 110–120° while stirring is continued. The precipitate is filtered off and washed twice with hot water. The filtrates are evaporated to dryness in vacuo and the residue is dried over phosphorus pentoxide. The crude 5-methoxy-6-cyclopropyl-4-pyrimidinol obtained melts at 113–116°. Sublimation of the crude product at 90–100°/0.1 torr yields the pure compound; it melts at 120–122°.

(d) 5.7 g. of the crude 5-methoxy-6-cyclopropyl-4-pyrimidinol are added to 36 ml. of ice cold phosphorus oxychloride and then 2.6 ml. of N,N-dimethyl aniline are added. The mixture obtained is stirred for 1½ hours at a bath temperature of 90–100° whereupon the excess phosphorus oxychloride is distilled off in vacuo and the residue is poured onto ice. The suspension obtained is extracted three times with 50 ml. of ether each time, the ether extract is washed first with water, then with 5% (percent by weight) of sodium hydrogen carbonate solution and again with water, dried over sodium sulphate and concentrated. The residue, crude, oily 4-chloro-5-methoxy-6-cyclopropyl pyrimidine, is used directly for the following reaction.

(e) A mixture of 10.7 g. of sulphanilamide sodium, 40 ml. of dimethyl sulphoxide, 4.61 g. of the crude chlorine compound obtained according to Example 19(d) and 0.6 g. of trimethylamine, dissolved in 6 ml. of dimethyl formamide, is heated for 48 hours at a bath temperature of 60–70° while stirring. The solution obtained is concentrated under high vacuum and the residue is stirred with water and ether. The pH of the aqueous phase is adjusted to 8–9 with solid carbon dioxide and the excess sulphanilamide which precipitates is filtered off. After acidifying the filtrate with 5 N hydrochloric acid until the pH is 5–6, the crude $N^1$-(5-methoxy-6-cyclopropyl-4-pyrimidinyl)-sulphanilamide is obtained therefrom. It is recrystallised once from aqueous ethanol and once from acetic acid ethyl ester/hexane whereupon it melts at 201–203°. Thin layer chromatography gives the Rf value of 0.65 (Silicagel Merck G; solvent: chloroform:methanol 4:1).

EXAMPLE 20

34.9 g. of sulphanilamide sodium and 32.5 g. of acetamide are mixed, the mixture is melted at 160° and left to cool to 90°. 14.6 g. of N-(6-cyclopropyl-5-methoxy-4-pyrimidinyl)-N,N,N-trimethyl-ammonium chloride (obtained from 6-cyclopropyl-5-methoxy-4-chloropyrimidine and trimethylamine) are then added, the whole is stirred for 10 minutes at 100°, the mixture is allowed to cool and stirred with water. The pH of the solution is adjusted to 8–9 with solid carbon dioxide and the precipitated sulphanilamide is filtered off. 6 N-hydrochloric acid is added to the filtrate until the pH is 5–6 and the crude $N^1$-(5-methoxy - 6 - cyclopropyl-4-pyrimidinyl)-sulphanilamide is filtered off under suction. It is identical with the product obtained according to Example 19.

EXAMPLE 21

(a) 4.6 g. of sodium are reacted in 120 ml. of dry ethanol At 55°, 31.2 g. of β-oxo-cyclopropane propionic acid ethyl ester are added dropwise to the solution obtained. Two minutes after this addition, 31.2 g. of methyl iodide are added dropwise and, after completion of the exothermic reaction, the mixture is refluxed for 1 hour. It is then cooled to 30° and concentrated in vacuo. The residue is mixed with 10 ml. of water and the suspension obtained is extracted three times with ether. The ether extract is washed once with water, dried over sodium sulphate and evaporated. The yellow oil which remains is distilled and pure α-methyl-β-oxo-cyclopropane propionic acid ethyl ester is obtained, B.P. 90–95°/12 torr.

(b) The crude 2 - mercapto-5-methyl-6-cyclopropyl-4-pyrimidinol (M.P. 220–220°, with decomposition) is obtained analogously to Example 19(b) from 5.8 g. of sodium in 115 ml. of dry ethanol, 28.6 g. of the ester prepared according to Example 3(a) and 21.4 g. of thiourea. Recrystallisation of the crude product from aqueous ethanol yields the pure compound which melts at 232–234° (with decomposition).

(c) 18.8 g. of the mercapto compound obtained according to example 21(b) in 268 ml. of water and 26.8 ml. of 25% (percent by weight) of aqueous ammonia, are desulphurised with 61.5 g. of Raney nickel by the method described in Example 19(c). The crude 5-methyl-5-cyclopropyl-4-pyrimidinol obtained melts at 180–182°. Sublimation of the crude product yields the pure compound which melts at 184–186°.

(d) 13.3 g. of the crude 5-methyl-6-cyclopropyl-4-pyrimidinol, 93 ml. of phosphorus oxychloride and 7 ml. of dimethyl aniline are reacted analogously to Example 21(d) to yield 4-chloro-6-cyclopropyl-5-methyl pyrimidine. After evaporation of the ether, the chlorine compound remains as a slightly greasy crystal mass; it melts at 80–82°.

(e) 5 g. of the crude compound produced according to Example 21(d) are added to a suspension of 14.6 g. of sulphanilamide sodium in 30 ml. of dimethyl sulphoxide and 0.36 g. of trimethylamine, dissolved in 4 ml. of dimethyl foramamide. The mixture is stirred at a bath temperature of 60° and gradually turns into a brown solution. After 90 hours, this is concentrated under high vacuum and the residue is worked up as described in Example 19(e). The crude $N^1$ - (5-methyl-6-cyclopropyl-4-pyrimidinyl) - sulphanilamide obtained melts at 229–232°. Recrystallisation of the crude product from aqueous ethanol and a little dimethyl formamide yields the pure compound which melts at 237–239°. Thin layer chromatography gives the Rf value of 0.6 (Silicagel Merck G; solvent: chloroform:methanol 4:1).

EXAMPLE 22

(a) 5.95 g. of acetamidine hydrochloride are added to a mixture of 10.7 g. of α-methyl-β-oxo-cyclopropane propionic acid ethyl ester (produced according to Example 21(a)) and 3 ml. of absolute ethanol and the whole is stirred well. 2.52 g. of pulverised sodium hydroxide and 2.5 ml. of dry ethanol are then added, stirring being continued from time to time until the sodium hydroxide has dissolved. The mixture, in a crystallisation dish over concentrated sulphuric acid, is then left to stand in a vacuum desiccator under 12 torr, the sulphuric acid being renewed each day. After about one week, the reaction mixture is dry whereupon it is thoroughly pulverised and mixed with 2.5 of sodium carbonate and 2.5 g. of sodium bicarbonate. This mixture is then continuously extracted with benzene for about 18 hours and the benzene extract is concentrated. The crude, crystalline 6-cyclopropyl-2,5-dimethyl-4-pyrimidinol melts at 218–220°.

(b) 7.0 g. of the above crude hydroxy compound are stirred for 45 minutes at a bath temperature of 90° with 54 ml. of phosphorus oxychloride and 6.37 ml. N,N-diethyl-aniline. The brown solution formed is concentrated to dryness under 12 torr. Ice is added to the residue which is then extracted three times with ether. The ether extract is then washed, first with dilute ice cold sodium bicarbonate solution, then with water and dried over sodium sulphate. After distilling off the ether, the oily 4-chloro-6-cyclopropyl-2,5-dimethyl-pyrimidine remains. This is used directly for further reaction.

(c) A mixture of 14.8 g. of sulphanilamide sodium, 44 ml. of dimethyl sulphoxide, 4.65 g. of the crude chlorine compound obtained according to 22(b) and 0.53 g. of trimethylamine in 5 ml. of dimethyl formamide are heated for 14 hours at a bath temperature of 50–60° and for 60 hours at 60–70°. The product is worked up as described in Example 19(e). After crystallisation from aqueous alcohol, $N^1$-(6-cyclopropyl-2,5-dimethyl - 4 - pyrimidinyl)-sulphanilamide is obtained, M.P. 185–187°.

EXAMPLE 23

(a) A solution of 15.5 g. of O-methyl isourea hydrochloride in 50 ml. of dry methanol and a solution of 6.45 g. of sodium in 70 ml. of dry methanol are added dropwise to each other, care being taken by a cooling bath that the temperature does not rise above —5°. 17.0 g. of α-methyl-β-oxo-cyclopropane propionic acid ethyl ester are then added and the reaction mixture is stirred for 2 to 3 days at 20–25° and then heated for 3 hours at a bath temperature of 70–80°. It is then concentrated in vacuo, the residue is rubbed with 100 ml. of water and acidified to pH 4 with 2N hydrochloric acid. The precipitated 6-cyclopropyl-2-methoxy-5-methyl-4-pyrimidinol can be used directly for the further reactions. In the crude state it melts at 205–207°.

(b) 8 g. of the crude product obtained as described above are reacted for 30 minutes at a bath temperature of 90° with 56 ml. of phosphorus oxychloride and 6.6 g. of N,N-diethyl aniline. A sample of the crude product obtained is recrystallised from hexane and the pure 4-chloro-6-cyclopropyl-2-methoxy - 5 - methyl - pyrimidine melts at 61–62°.

(c) 8.3 g. of the 4-chlorine compound and 17.2 g. of sulphanilamide sodium in 72 ml. of dimethyl sulphoxide and 0.88 g. of trimethylamine in 8 ml. of dimethyl formamide are reacted as described in Example 19(e) for 16 hours at a bath temperature of 40° and then for 40 hours at a bath temperature of 60°. The pure $N^1$-(6-cyclopropyl-2-methoxy-5-methyl - 4 - pyrimidinyl)-sulphanilamide obtained from aqueous ethanol melts at 213–214°.

EXAMPLE 24

(a) 6.8 g. of 6-cyclopropyl - 4 - pyrimidinol (produced analogously to Example 21(b) and (c)) are suspended in 15 ml. of glacial acetic acid and 0.3 ml. of acetanhydride. On heating for a few minutes at 80° a clear solution is obtained. The solution is allowed to cool to 50–55° and 8.3 g. of N-chlorosuccinimide are added in portions. The whole is stirred for 3 hours at a bath temperature of 60° and, after cooling to about 20°, it is filtered and the residue is washed with water. The crude 5-chloro-6-cyclopropyl-4-pyrimidinol melts at 218–220°.

(b) 6 g. of the crude compound obtained as described above, are added to an ice cooled mixture of 3 ml. of phosphorus oxychloride and 0.6 ml. of dimethyl formamide. The whole is stirred for 45 minutes at a bath temperature of 110°. A red solution is formed which is concentrated under 12 torr. The residue is poured onto ice and extracted several times with 50 ml. of hexane each time. After distilling off the solvent, the oily 6-cyclopropyl-4,5-dichloropyrimidine remains.

(c) A mixture of 5.6 g. of 6-cyclopropyl-4,5-dichloropyrimidine, 14.3 g. of sulphanilamide sodium, 30 ml. of dimethyl formamide and a solution of 0.3 g. of trimethylamine in 3 ml. of dimethyl formamide is stirred for 2 hours at a bath temperature of 60°. Another 0.3 g. of trimethylamine in 3 ml. of dimethyl formamide are then added and the mixture is stirred for another 13–14 hours at a bath temperature of 70°. The dark brown suspension formed is evaporated to dryness under a pressure of 0.1 torr. The residue is dissolved in water, the pH of the solution is adjusted to 9.0 with carbon dioxide, and the solution is stirred for 2 hours. Unused sulphanilamide is filtered off, the filtrate is washed once with ether and the pH of the filtrate is adjusted to 6.0 with 5 N hydrochloric acid. After 1 hour, the precipitated crude product is filtered off and recrystallized from 2-methoxyethanol/water. $N^1$- (5 - chloro - 6 - cyclopropyl-4-pyrimidinyl)-sulphanilamide is obtained, M.P. 202–203°.

EXAMPLE 25

(a) 20.85 g. of cyclopropyl carboxamidine hydrochloride are dissolved in 60 ml. of dry methanol and the solution is cooled to —5°. First a solution of 8.04 g. of sodium in 81 ml. of dry methanol is added while continuously stirring and then 30.6 g. of methyl malonic acid diethyl ester are added. The temperature is allowed to rise to 20° within about 2 hours whereupon stirring is continued for another 2 days. The product is left to stand for 4 days at 20°, then heated for 1½ hours at a bath temperature of 50–60° after which the solvent is distilled off under vacuo. 100 ml. of water are added to the residue and the pH is adjusted to 4–5 with 2 N hydrochloric acid. The precipitate is filtered off under suction, washed twice with water and dried over phosphorus pentoxide in vacuum desiccator. The 2-cyclopropyl-5-methyl-4,6-pyrimidine diol did not melt at over 300°.

(b) 15 g. of the pyrimidine obtained according to (a) are added to a mixture of 145 ml. of phosphorus oxychloride and 16 ml. of pyridine and the whole is heated for 2 hours at a bath temperature of 100°. The excess phosphorus oxychloride is then distilled off at 12 torr at a bath temperature of 60° whereupon water is added to the residue. The reaction is exothermic; the temperature is kept under 20° by the addition of ice. The mixture is extracted with hexane, the hexane extract is washed once with water and dried over sodium sulphate. After removal of the solvent, the crude, crystalline 2-cyclopropyl-4,6-dichloro-5-methyl-pyrimidine remains.

(c) 74 ml. of dry ethanol are saturated with methyl mercaptan while cooling with ice and 7.45 g. of the above crude product are dissolved in the cold solution. A solution of 0.99 g. of sodium methylate in 17 ml. of dry ethanol is added dropwise within 20 minutes while stirring and then the mixture is stirred for 18 hours at 20°. The suspension is evaporated under vacuum at 30° and the residue obtained is extracted with about 40° warm hexane. After concentrating the extract, the crystalline crude product remains. Recrystallised from a little petroleum ether, the 2-cyclopropyl-4-chloro-5-methyl-6-methylthiopyrimidine melts at 49–51°.

(d) A mixture of 6.67 g. of sulphanilamide sodium, 30 ml. of dimethyl sulphoxide and 0.1 g. of trimethylamine dissolved in 6 ml. of dimethyl formamide, and 3.35 g. of the pyridimidine compound produced under (c) is heated for 62 hours at a bath temperature of 60°. The reaction mixture is worked up according to Example 19(e). Crystallisation of the crude product from methoxyethanol/water, yields pure $N^1$-(2-cyclopropyl-5-methyl - 6 - methylthio - 4 - pyrimidinyl)-sulphanilamide, M.P. 229–230°.

EXAMPLE 26

Example 24 is repeated but in step (a) thereof, an equivalent amount of N-bromo-succinimide is used in lieu of 8.3 g′ of N-chloro-succinimide.

$N^1$ - 5 - bromo - 6 - cyclopropyl-4-pyrimidyl)-sulphanilamide is thereby obtained as the product of step (c) via 5-bromo - 6 - cyclopropyl-4-chloro-pyrimidine (step (b).

I claim:
1. A compound of the formula

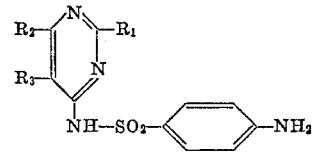

wherein
one and only one of $R_1$, $R_2$ and $R_3$ is cyclopropyl;
each of $R_1$ and $R_2$, when other than cyclopropyl, is hydrogen, lower alkyl, lower alkoxy, lower alkylthio or halogen; and
$R_3$, when other than cyclopropyl, is hydrogen, lower alkyl, lower alkoxy or halogen.
2. A compound as defined in claim 1, wherein
$R_1$ represents hydrogen,
$R_2$ represents cyclopropyl and
$R_3$ represents hydrogen.
3. A compound as defined in claim 1, wherein
$R_1$ represents methyl,
$R_2$ represents cyclopropyl and
$R_3$ represents hydrogen.
4. A compound as defined in claim 1, wherein
$R_1$ represents methoxy,
$R_2$ represents cyclopropyl and
$R_3$ represents hydrogen.
5. A compound as defined in claim 1, wherein
$R_1$ represents cyclopropyl, and
both $R_2$ and $R_3$ represent hydrogen.
6. A compound as defined in claim 1, wherein
$R_1$ represents cyclopropyl,
$R_2$ represents methyl and
$R_3$ represents hydrogen.
7. A compound as defined in claim 1, wherein
$R_1$ represents hydrogen,
$R_2$ represents methoxy and
$R_3$ represents cyclopropyl.
8. A compound as defined in claim 1, wherein
$R_1$ represents hydrogen,
$R_2$ represents cyclopropyl and
$R_3$ represents chlorine.
9. A compound as defined in claim 1, wherein
$R_1$ represents hydrogen,
$R_2$ represents cyclopropyl and
$R_3$ represents methoxy.
10. A compound as defined in claim 1, wherein
$R_1$ represents methyl,
$R_2$ represents cyclopropyl and
$R_3$ represents methyl.
11. A nontoxic pharmaceutically acceptable alkali metal, alkaline earth metal or organic amine salt of a compound according to claim 1.

12. A compound according to claim 1 wherein one of $R_1$ and $R_2$ is cyclopropyl.

13. A compound according to claim 1 wherein each of $R_1$ and $R_2$ when other than cyclopropyl, is hydrogen, lower alkyl, lower alkoxy, lower alkylthio, or halogen and $R_3$, when other than cyclopropyl is hydrogen or methoxy.

14. A nontoxic pharmaceutically acceptable alkali metal, alkaline earth metal or organic amine salt of a compound according to claim 13.

References Cited

UNITED STATES PATENTS 2,407,966   9/1946   Sprague _____ 260—239.75

HENRY R. JILES, Primary Examiner

HARRY I. MOATZ, Asistant Examiner

U.S. Cl. X.R.

260—154, 251, 256.4, 256.5, 468, 564; 424—229